US009533702B2

(12) United States Patent
Miura

(10) Patent No.: US 9,533,702 B2
(45) Date of Patent: Jan. 3, 2017

(54) ELECTRIC POWER STEERING APPARATUS

(71) Applicant: NSK LTD., Shinagawa-ku, Tokyo (JP)

(72) Inventor: Tomohiro Miura, Gunma (JP)

(73) Assignee: NSK Ltd., Tokyo (JP)

( * ) Notice: Subject to any disclaimer, the term of this patent is extended or adjusted under 35 U.S.C. 154(b) by 8 days.

(21) Appl. No.: 14/653,719

(22) PCT Filed: Dec. 25, 2014

(86) PCT No.: PCT/JP2014/006466
§ 371 (c)(1),
(2) Date: Jun. 18, 2015

(87) PCT Pub. No.: WO2015/104784
PCT Pub. Date: Jul. 16, 2015

(65) Prior Publication Data

US 2016/0280257 A1 Sep. 29, 2016

(30) Foreign Application Priority Data

Jan. 8, 2014 (JP) ................................ 2014-001807

(51) Int. Cl.
*B62D 5/04* (2006.01)
*B62D 6/00* (2006.01)

(52) U.S. Cl.
CPC ........... *B62D 5/0481* (2013.01); *B62D 5/0484* (2013.01); *B62D 5/0409* (2013.01)

(58) Field of Classification Search
CPC ........................... B62D 5/0481; B62D 5/0484
See application file for complete search history.

(56) References Cited

U.S. PATENT DOCUMENTS

2003/0200018 A1 10/2003 Arimura
2005/0150712 A1 7/2005 Tokumoto
(Continued)

FOREIGN PATENT DOCUMENTS

JP 2003-319683 A 11/2003
JP 2005-186759 A 7/2005
(Continued)

OTHER PUBLICATIONS

International Search Report dated Mar. 24, 2015, with partial English translation (three (4) pages).
(Continued)

*Primary Examiner* — Dale Moyer
(74) *Attorney, Agent, or Firm* — Crowell & Moring LLP

(57) ABSTRACT

To detect and store occurrence of a reverse connection when the reverse connection has occurred, and to restricts a power assist at the next startup of a controller. In an ECU for controlling an electric motor that applies a steering assist torque on a steering mechanism, a microcomputer transmits a drive signal to a driver that drives an inverter, which controls current of the electric motor, in accordance with the drive signal. A reverse connection storage circuit is attached in parallel with the inverter, and detects and stores the occurrence of the reverse connection when the reverse connection of the ECU and a battery has occurred, and notifies the microcomputer of the occurrence of the reverse connection at the next startup of the ECU. The microcomputer transmits a signal indicating non-permission to the driver in accordance with the notification. The driver restricts the power assist upon receiving the signal.

6 Claims, 4 Drawing Sheets

14c
INVERTER
15
14a
14b
13
14d
MICROCOMPUTER
FET DRIVER
ELECTRIC MOTOR
REVERSE CONNECTION STORAGE CIRCUIT
GATE PROHIBITING

(56) References Cited

U.S. PATENT DOCUMENTS

| | | | | |
|---|---|---|---|---|
| 2006/0067022 | A1* | 3/2006 | Gallagher | B62D 5/0484<br>361/84 |
| 2015/0035464 | A1* | 2/2015 | Maekawa | H02M 7/5387<br>318/400.21 |

FOREIGN PATENT DOCUMENTS

| | | | |
|---|---|---|---|
| JP | 2007-53876 | A | 3/2007 |
| JP | 2010-269726 | A | 12/2010 |
| JP | 2012-79513 | A | 4/2012 |

OTHER PUBLICATIONS

Written Opinion (PCT/ISA/237) dated Mar. 24, 2015, with English translation (Six (6) pages).

* cited by examiner

ELECTRIC POWER STEERING APPARATUS

TECHNICAL FIELD

The present disclosure relates to an electric power steering apparatus that applies a steering assist force on a steering system to alleviate a steering load on a driver.

BACKGROUND ART

For a steering device of a vehicle, an electric power steering (EPS) apparatus is conventionally known that applies a steering assist force on a steering mechanism by driving an electric motor in accordance with a steering force exerted by a driver who steers a steering wheel.

The electric power steering apparatus includes a reverse connection protecting device configured to protect a controller (ECU: Electronic Control Unit) from an overcurrent when a battery (rechargeable battery) is reversely connected. The reverse connection means a connection in which a positive pole and a negative pole of the battery are connected reversely with respect to normal connection for controller ECU). The reverse connection protecting device includes an in-vehicle relay and a driving circuit thereof. The in-vehicle relay incorporates a contact-type mechanical switch and an electromagnetic coil, and an excitation current flowing through the electromagnetic coil makes the coil an electromagnet thus attracting an iron piece of the switch, bringing movable and fixed contacts into contact, and turning on the switch. When the excitation current is no longer flowed to the electromagnetic coil, the movable and fixed contacts are separated by a return spring provided on the iron piece of the switch. The reverse connection protecting device is a typical method of protecting the reverse connection since the switch of the in-vehicle relay is not turned on in the reverse connection.

However, the in-vehicle relay used for the reverse connection protecting device is for large currents, and thus is of large scale compared to other elements, and is also expensive. With reduction in the price of vehicles in recent years, demands to reduce the price of the electric power steering apparatus is also becoming stronger, and the electric power steering apparatus of a type that does not include the reverse connection protecting device is being demanded as part of the price reduction. In the general electric power steering apparatus of a type that does not include the reverse connection protecting device, a fuse arranged in the vehicle is blown when the battery and the controller (ECU) are reverse connected, thus preventing smoking and ignition of the controller (ECU). For example, in an abnormality history retention device described in PTL 1, an abnormality of a secondary battery is detected based on an output of the secondary battery and the detection result is output, and when the switching element permits electric conduction depending on the detection result, a discharging current flows from the secondary battery thus causing heat generation in a heat generating element, and a temperature fuse is blown by the heat from the heat generating element.

CITATION LIST

Patent Literature

PTL 1: JP 2012-079513 A

SUMMARY OF INVENTION

Technical Problem

However, a large current out of a guarantee range, which exceeds the maximum absolute rating flows to the element inside the controller (ECU) during a time period until the blow of the fuse, and the element may fall into an intermediate breakdown state. When the blown fuse is replaced in the intermediate breakdown state, and when the reverse connection is resolved and the connection is returned to the normal state, the normal operation cannot be guaranteed even if the controller (ECU) is activated. Furthermore, if the element that has been in the intermediate breakdown state due to the reverse connection breaks down thereafter during travelling, a behavior undesirable for drivers may occur.

In order to solve the problem described above, it is an object of the present disclosure to provide an electric power steering apparatus of higher safety capable of detecting and storing the occurrence of the reverse connection so as to greatly reduce a probability of the occurrence of assist abnormality or the like during the subsequent travelling.

Solution to Problem

An electric power steering apparatus according to one aspect of the present disclosure includes an inverter configured to control a current of an electric motor that applies a steering assist torque on a steering mechanism; a battery configured to supply power to the electric motor via the inverter; and a controller (ECU) connected to the battery and configured to drive the inverter to control the electric motor. In the controller (ECU), a drive control unit is configured to drive the inverter in accordance with a drive signal. A signal control unit is configured to transmit the drive signal to the drive control unit. A reverse connection storage unit is attached to the battery in parallel with the inverter, and configured to detect and store occurrence of a reverse connection of the controller (ECU) and the battery when the reverse connection has occurred, and to notify the signal control unit of the occurrence of the reverse connection at the next startup of the controller (ECU). For example, the signal control unit may be a microcomputer. The drive control unit may be an FET driver.

The signal control unit is configured to transmit a signal indicating non-permission of drive of the drive control unit to the drive control unit when notified of the occurrence of the reverse connection from the reverse connection storage unit. In this case, the signal control unit may transmit the signal indicating non-permission of the drive of the drive control unit to the drive control unit and also transmit a device control signal to the notifying device to notify the driver of the occurrence of the reverse connection and urge the replacement of the controller. When receiving the signal indicating the non-permission from the signal control unit, the drive control unit restricts or prohibits the drive of the inverter to restrict or prohibit the drive of the electric motor.

The reverse connection storage unit is configured to output a signal of a first voltage to the signal control unit when the reverse connection has not occurred. The reverse connection storage unit is configured to detect and store the occurrence of the reverse connection and to output a signal of a second voltage to the signal control unit at the next startup of the controller to notify the signal control unit of the occurrence of the reverse connection, when the reverse connection has occurred. The signal control unit is configured to transmit the signal of the first voltage to the drive control unit as a signal indicating permission of drive of the drive control unit when the voltage of the signal from the reverse connection storage unit is the first voltage, and to transmit the signal of the second voltage to the drive control unit as a signal indicating non-permission of the drive of the drive control unit when the voltage of the signal from the reverse connection storage unit is the second voltage.

In the above reverse connection storage unit, a diode is attached to the battery in parallel with the inverter to prevent reverse direction current by the rectification. A fuse is positioned on an anode side of the diode, the fuse being in a conduction state when the reverse connection has not occurred, and being in an overcurrent state and blown to detect and store the occurrence of the reverse connection when the reverse connection has occurred. A restriction resistor is positioned on a cathode side of the diode, and restricts a current within a range where the fuse is surely blown and the diode does not cause open fault for a potential difference at time of the occurrence of the reverse connection. A pull-up resistor is connected to a signal line extending from between the diode and the fuse to the signal control unit, and configured to maintain a voltage of an output signal at the first voltage in the conduction state of the fuse, and to pull up the voltage of the output signal to the second voltage when the fuse is blown.

Advantageous Effects of Invention

According to one aspect of the present invention, if the reverse connection has occurred at least once in the electric power steering apparatus, the occurrence of the reverse connection is detected and stored to restrict or prohibit the power assist during the subsequent travelling, thus greatly reducing the probability of the occurrence of assist abnormality, and the like and enhancing safety.

DESCRIPTION OF EMBODIMENTS

An embodiment of the present disclosure will now be described with reference to the drawings.

In the detailed description below, numerous specific details are described to give a complete understanding of the embodiment of the present disclosure. However, it should be apparent that one or more implementing modes can be implemented without such specific details. In addition, well-known structures and devices are schematically illustrated to simplify the drawings.

Configuration

Figure 1:
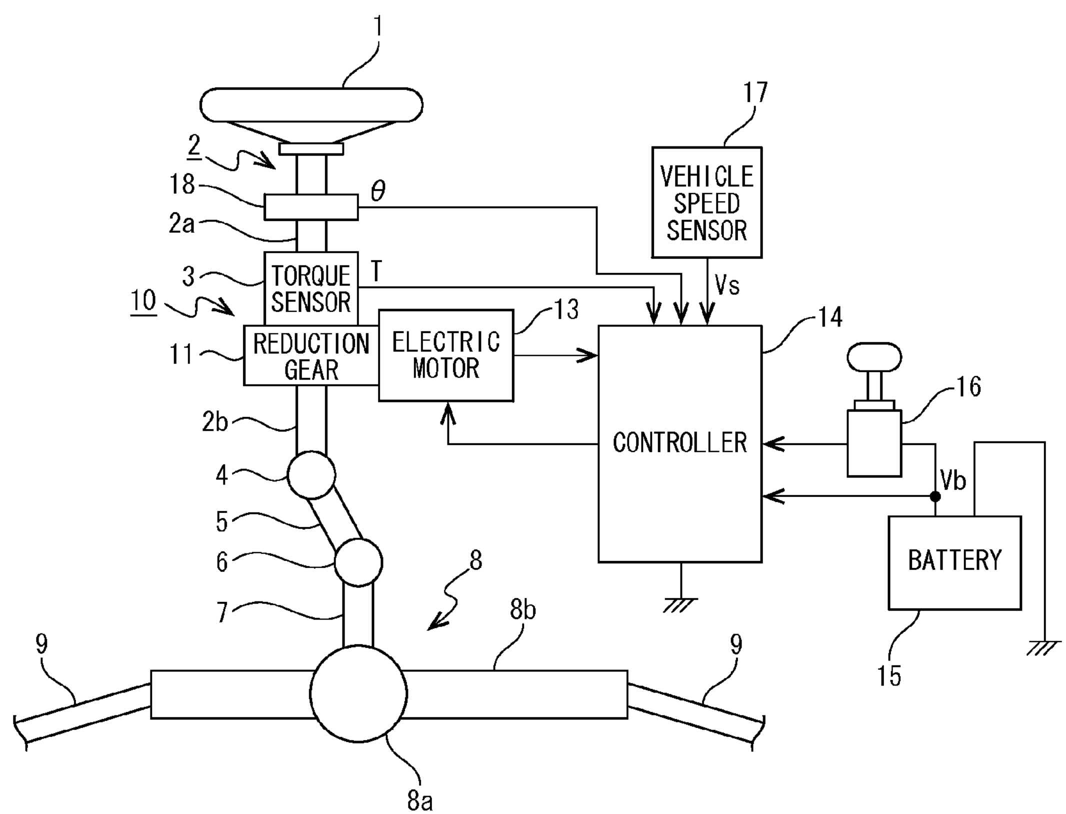
FIG. 1 is a schematic configuration view illustrative of an electric power steering apparatus according to one embodiment of the present disclosure.

FIG. 1 is an overall configuration view illustrative of an electric power steering apparatus according to one embodiment of the present disclosure.

In the electric power steering apparatus according to the present embodiment, a steering wheel 1 is coupled to a steering shaft 2 to transmit to the steering shaft 2 steering torque (steering force) applied by a driver. The steering shaft 2 includes an input shaft 2*a* and an output shaft 2*b*. One end of the input shaft 2*a* is coupled to the steering wheel 1. The other end of the input shaft 2*a* is coupled to one end of the output shaft 2*b* via a torque sensor 3. The other end of the output shaft 2*b* is coupled to one end of an intermediate shaft 5 via a universal joint 4. The other end of the intermediate shaft 5 is coupled to one end of a pinion shaft via a universal joint 6. The other end of the pinion shaft 7 is coupled to a tie rod 9 via a steering gear 8.

Therefore, the input shaft 2*a* transmits the steering torque transmitted from the steering wheel 1 to the output shaft 2*b* via the torque sensor 3. The output shaft 2*b* transmits the steering torque, which is transmitted from the input shaft 2*a* via the torque sensor 3, to the intermediate shaft 5 via the universal joint 4, and further transmits the steering torque to the pinion shaft 7 via the universal joint 6. The pinion shaft 7 transmits the transmitted steering torque to the tie rod 9 via the steering gear 8 to steer a steered wheel (wheel) (not shown). The steering gear 8 is configured as a rack and pinion type including a pinion 8*a*, which is coupled to the pinion shaft 7, and a rack 8*b*, which is to be geared with the pinion 8*a*, and converts the rotational motion transmitted to the pinion 8*a* to a linear motion by means of the rack 8*b*.

A steering assisting mechanism 10 is coupled to the output shaft 2*b* of the steering shaft 2 to transmit a steering assist torque (steering assist force) to the output shaft 2*b*. The steering assisting mechanism 10 includes a reduction gear 11 that is coupled to the output shaft 2*b*, and an electric motor 13 that is coupled to the reduction gear 11 and that is configured to generate the steering assist torque for a steering system.

The torque sensor 3 is arranged between the input shaft 2*a* and the output shaft 2*b* of the steering shaft 2 to detect the steering torque exerted on the steering wheel 1 and transmitted to the input shaft 2*a*. For example, the torque sensor 3 is configured to detect a torsion angle displacement of a torsion bar (not shown) inserted between the input shaft 2*a* and the output shaft 2*b* as a magnetic signal, the angle displacement being generated by the steering torque, and to convert the magnetic signal to an electric signal. The torsion bar is a type of spring that uses a repulsion force that appears when a metal bar is twisted. The torque sensor 3 is configured to detect an amount of twist (deg) between the anterior and posterior parts of the torsion bar, and to calculate a torque (Nm) from the amount of twist (deg) and a known spring rate (Nm/deg) of the torsion bar. Any detection principle (self-inductance type, magnetic type, electromagnetic induction type, etc.) and any signal output method (digital, analog, etc.) can be adopted for the torque sensor 3 as long as it is a sensor of a type configured to detect the twist of the torsion bar. The torque sensor 3 is configured to provide a torque detection value T to the controller (ECU) 14.

The controller (ECU) 14 is configured to carry out the power assist (steering assistance) corresponding to the torque detection value T upon receiving the torque detection value T. In other words, the controller (ECU) 14 is configured to calculate the steering assist torque depending on the torque detection value T, and to drive the electric motor 13 based on the steering assist torque. The controller (ECU) 14 is actuated by being power supplied from a battery 15 (e.g., 13V) serving as a DC (Direct Current) power supply. The battery 15 has a negative pole that is grounded, and a positive pole that is connected to the controller (ECU) 14 through two power lines. One of the two power lines is connected to the controller (ECU) 14 through an ignition switch 16 with which an engine start is carried out, and the other power line is directly connected to the controller (ECU) 14 without interposing the ignition switch 16 in between. In addition to the torque detection value T, the controller (ECU) 14 is configured to acquire (input) a vehicle speed Vs detected by a vehicle speed sensor 17 and a steering angle θ detected by a steering angle sensor 18. Although the vehicle speed sensor 17 and the steering angle sensor 18 are arranged in FIG. 1, the vehicle speed sensor 17 and the steering angle sensor 18 actually may not be arranged. For example, the controller (ECU) 14 may acquire (input) the vehicle speed Vs and the steering angle θ received from a CAN (Controller Area Network) or the like. The controller (ECU) 14 is configured to carry out a steering assistance control of applying, on the steering system, the steering assist torque depending on the torque detection value T, the vehicle speed Vs, and the steering angle θ. Specifically, the controller (ECU) 14 is configured to calculate a current command value for generating the steering assist torque in the electric motor 13, and to feedback-control the drive current to supply to the electric motor 13 by the calculated current command value and a motor current detection value. The controller (ECU) 14 is also configured to notify the driver of the occurrence of the reverse connection and the abnormality of the electric power steering apparatus, and to light a lamp such as an indicator lamp (display light), a warning lamp (warning light), or the like (not shown) (light emission, flashing, color change, etc.) to urge to replace the controller (ECU) 14. Alternatively, error information, and the like may be displayed on a navigation monitor (display) (not shown). Actually, a mark such as an icon, a lamp, or the like may be displayed on the monitor, and such marks may be lighted (light emission, flashing, color change, etc.). Furthermore, an audio may be output from a speaker or the like to make the notification. Moreover, a portable terminal of the driver may be used instead of the monitor, the speaker, or the like. Such lamp, monitor, speaker, portable terminal, or the like corresponds to the "notifying device" for notifying the driver of the occurrence of the reverse connection or the abnormality of the electric power steering apparatus.

Hereinafter, a characteristic configuration for detecting and storing the occurrence of the reverse connection of the controller (ECU) 14 and the battery 15, and for not permitting the power assist at the next startup of the controller (ECU) will be described. When non-permitting the power assist, the power assist may be restricted (output may be lowered) or the power assist may be prohibited (stopped). The prohibiting may be considered as one mode of restriction.

Figure 2:
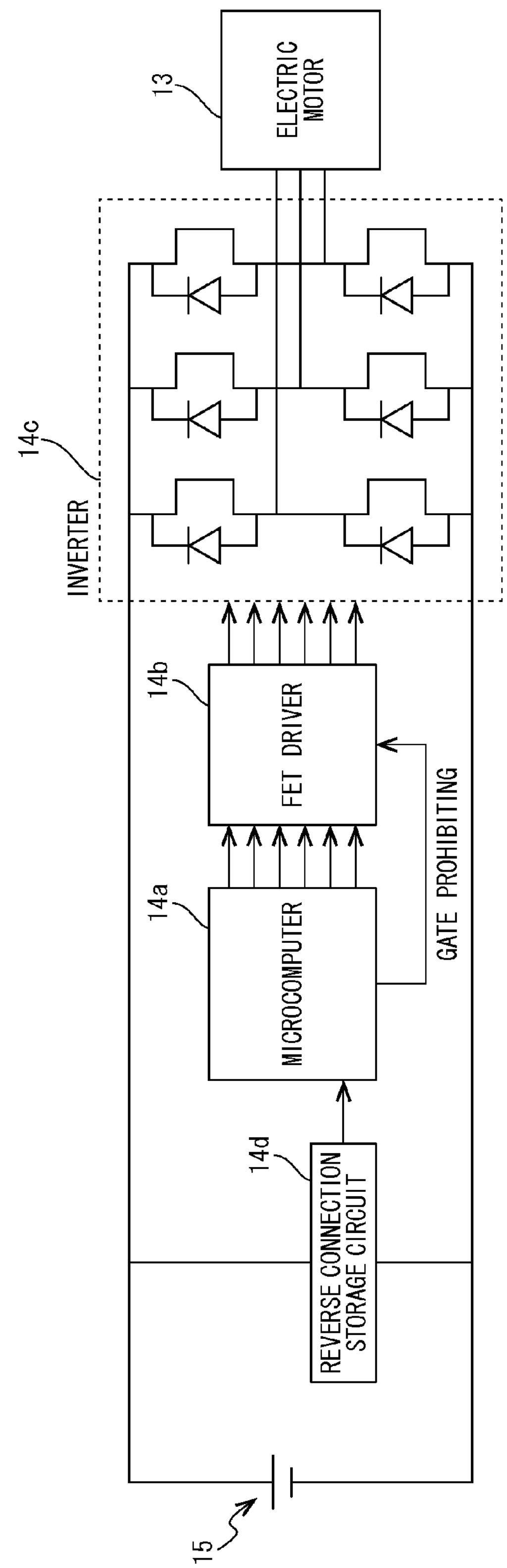
FIG. 2 is a view illustrative of a configuration example of a controller according to one embodiment of the present disclosure.

FIG. 2 is a view illustrative of a configuration example of the controller (ECU) 14 according to the present embodiment. FIG. 2 illustrates a state in which the battery 15 is normally connected. The controller (ECU) 14 includes a microcomputer 14*a*, an FET driver 14*b*, an inverter 14*c*, and a reverse connection storage circuit 14*d*.

The microcomputer 14*a* is configured to transmit a PWM (Pulse Width Modulation) signal to the FET driver 14*b*. Furthermore, the microcomputer 14*a* is configured to transmit to the FET driver 14*b* a gate prohibiting signal (permission/non-permission signal) indicating permission/non-permission of the PWM drive of the FET driver 14*b* so that permission/non-permission of the PWM drive can be selected. The non-permission of the PWM drive includes restriction and prohibition of the PWM drive. For example, the gate prohibiting signal is defined to have a value "0V" (low voltage: Low) when permitting and to have a value "5V" (high voltage: High) when not permitting. In other words, a low active (negative logic) is adopted. Actually, however, this example is not the sole case. When transmitting the gate prohibiting signal indicating non-permission of the PWM drive of the FET 14*b* to the FET driver 14*b*, the microcomputer 14*a* further transmits a device control signal to the notifying device, and notifies the driver (or possibly an operator) of the occurrence of the reverse connection and the abnormality of the electric power steering apparatus to urge the replacement of the controller (ECU) 14 or the reverse connection storage circuit 14*d*. For example, a lighting control signal for lighting is transmitted to the lamp such as the indicator lamp (display light), the warning lamp (warning light), or the like (not shown) to light the lamp (light emission, flashing, color change, etc.). Alternatively, an image display signal for display is transmitted to the navigation monitor (not shown) to display the error information or the like. Actually, the mark such as the icon, the lamp, or the like may be displayed on the monitor, and such marks may be lighted (light emission, flashing, color change, etc.). The microcomputer 14*a* may transmit an audio output signal to the speaker or the like to output the audio. A notification signal (which may be image display signal or audio output signal) may be transmitted to the portable terminal of the driver in place of the monitor, the speaker, or the like to notify the driver through the portable terminal. The microcomputer 14*a* may transmit the device control signal with respect to the notifying device in parallel with the gate prohibiting signal. A microprocessor (MPU: Micro-Processing Unit) and a microcontroller (MCU: Micro-Control Unit) are assumed as the microcomputer 14*a* herein. Actually, however, these examples are not the sole cases.

The FET driver 14*b* is configured to drive the inverter 14*c* in accordance with the PWM signal. Actually, the FET driver 14*b* may be integrated with the microcomputer 14*a*. The inverter 14*c* is configured to control the current of the electric motor 13 in accordance with the PWM signal. Normally, the inverter 14*c* is configured to electrically generate the AC power from the DC power (reverse conversion). The inverter 14*c* is configured by an FET (Field Effect Transistor). The MOSFET (Metal Oxide Semiconductor Field Effect Transistor) is widely known for the typical FET. A power MOSFET is assumed for the inverter 14*c* herein. Actually, however, the inverter 14*c* may be a CMOS inverter in which a P-type MOS (p-MOS) is arranged on the upper stage and an N-type MOS (n-MOS) is arranged on the lower stage. The inverter 14*c* includes an FET bridge using three FETs on the upper stage and three FETs on the lower stage. For example, the inverter 14*c* is a three-phase inverter configured to supply power in three-phase AC. The terms "upper stage" and "lower stage" merely indicate the position relationship of the FET (upper stage FET, lower stage FET) in a typical inverter circuit. The FET may be synonymized as a switch circuit. These examples are, however, not the sole cases.

If the reverse connection has occurred at least once in the connection of the controller (ECU) 14 and the battery 15, the reverse connection storage circuit 14*d* detects and stores such state (occurrence of reverse connection), and notifies the microcomputer 14*a* of the occurrence of the reverse connection (outputs a command value indicating the occurrence of the reverse connection) at the next startup of the controller (ECU) 14. For example, the reverse connection storage circuit 14*d* outputs 0V as the output signal in a state in which the reverse connection has never occurred, and outputs 5V as the output signal in a state in which the reverse connection has occurred at least once. The microcomputer 14*a* is configured to transmit the gate prohibiting signal of 0V (permission) to the FET driver 14*b* if the voltage of the output signal from the reverse connection storage circuit 14*d* is 0V, and to transmit the gate prohibiting signal of 5V (non-permission) to the FET driver 14*b* if the voltage of the output signal from the reverse connection storage circuit 14*d* is 5V.

Figure 3:
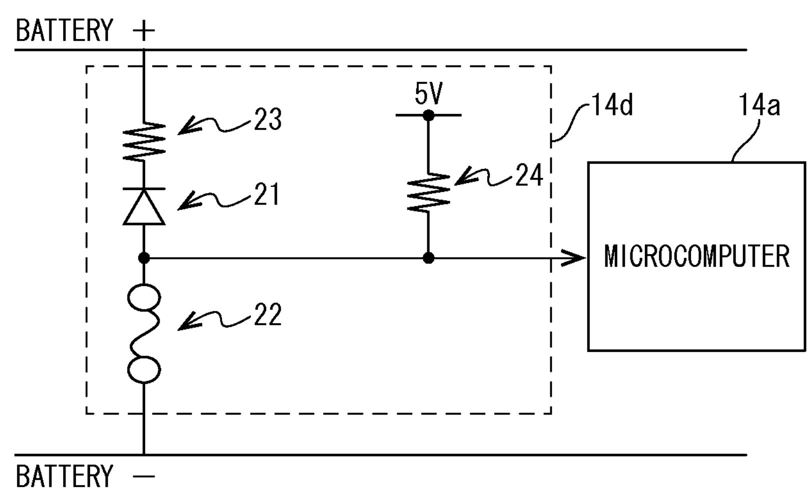
FIG. 3 is a view illustrative of one example of a configuration of a reverse connection storage circuit according to one embodiment of the present disclosure.

FIG. 3 is a view showing one example of the configuration of the reverse connection storage circuit 14*d*. FIG. 3 shows the state in which the battery 15 is normally connected. The reverse connection storage circuit 14*d* includes a diode 21, a fuse 22, a restriction resistor 23, and a pull-up resistor 24. The diode 21, the fuse 22, and the restriction resistor 23 are attached to the battery 15 in parallel with the inverter 14*c*.

The diode 21 is a diode that prevents a reverse direction current by the rectification, and is arranged to be in a non-conduction state if the reverse connection has not occurred and to be in a conduction state if the reverse connection has occurred.

The fuse 22 is arranged on the anode side of the diode 21, and is immediately blown when reaching an overcurrent state. The time taken until the blow of the fuse 22 is desirably set to be shorter than or equal to a reverse connection time that can be tolerated by the controller (ECU) 14. The reverse connection storage circuit 14*d* is configured to detect and store the occurrence of the reverse connection by the blow of the fuse 22.

The restriction resistor 23 is arranged on the cathode side of the diode 21 to restrict to the current at which the fuse 22 is surely blown and the diode 21 does not disconnect and breakdown for the potential difference at time of the occurrence of the reverse connection. As shown in FIG. 3, if the fuse 22 is connected to the negative pole of the battery 15 and the restriction resistor 23 is connected to the positive pole of the battery 15, the battery 15 is in the normally connected state (state in which the reverse connection has not occurred). If, on the other hand, the fuse 22 is connected to the positive pole of the battery 15 and the restriction resistor 23 is connected to the negative pole of the battery 15, the battery 15 is in the reverse connected state (state in which the reverse connection has occurred). A signal line is provided from a connection node between the diode 21 and the fuse 22 toward the microcomputer 14*a*, and the pull-up resistor 24 is connected to the signal line.

The pull-up resistor 24 maintains (fixes) the output signal at 0V in the conduction state (at time of non-disconnection) of the fuse 22, and pulls up the output signal to 5V upon the blow (at time of disconnection) of the fuse 22.

Operation

The operation of the controller (ECU) 14 according to the present embodiment when the controller (ECU) 14 and the battery 15 are connected will be described below.

As shown in FIG. 2, if the battery 15 is normally connected (when reverse connection has not occurred), in the reverse connection storage circuit 14*d*, the diode 21 prevents the current from the positive pole of the battery 15 and the fuse 22 reaches the conduction state, and the pull-up resistor 24 is connected to the negative pole of the battery 15 through the fuse 22, whereby the voltage of the output signal of the reverse connection storage circuit 14*d* becomes 0V.

The microcomputer 14*a* transmits the gate prohibiting signal of 0V (permission) to the FET driver 14*b* when the voltage of the output signal from the reverse connection storage circuit 14*d* is 0V. The microcomputer 14*a* also transmits the PWM signal to the FET driver 14*b*.

When receiving the gate prohibiting signal of 0V (permission) from the microcomputer 14*a*, the FET driver 14*b* drives the inverter 14*c* in accordance with the PWM signal from the microcomputer 14*a* upon receiving the PWM signal from the microcomputer 14*a*, and controls the current of the electric motor 13 with the inverter 14*c*. Thus, when receiving the gate prohibiting signal of 0V (permission) from the microcomputer 14*a*, the FET driver 14*b* controls the drive of the electric motor 13 through the inverter 14*c* to normally perform the power assist.

Figure 4:
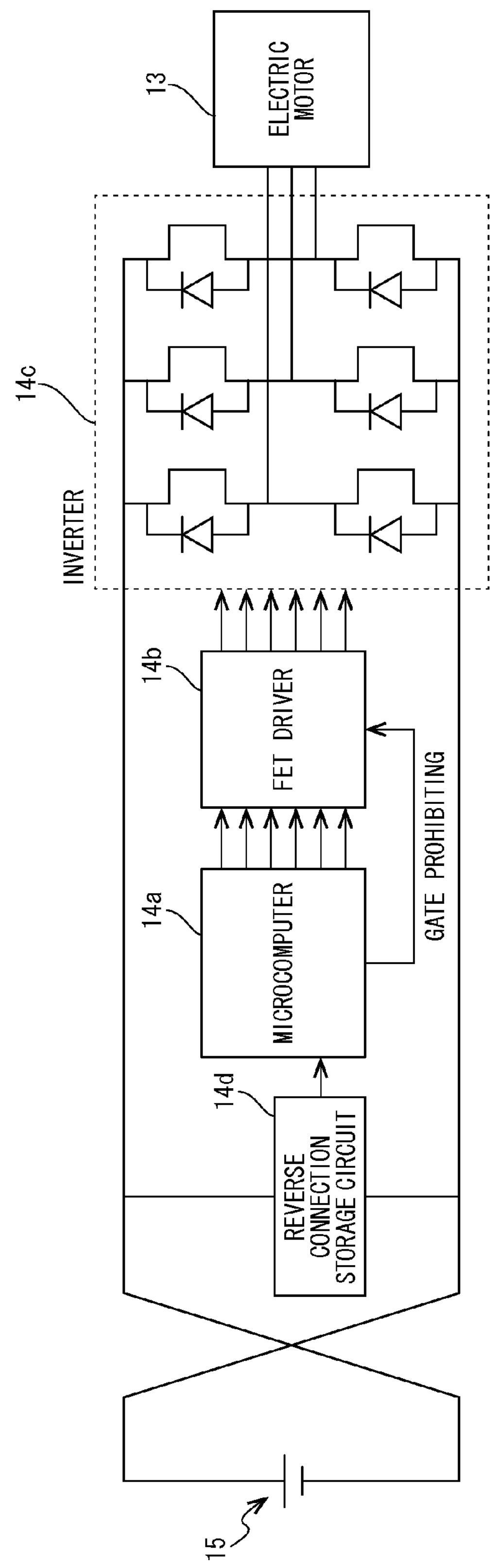
FIG. 4 is a view illustrative of a state in which a reverse connection has occurred in one embodiment of the present disclosure.

As shown in FIG. 4, on the other hand, if the battery 15 has been reverse connected even once (when reverse connection has occurred), in the reverse connection storage circuit 14*d*, the diode 21 is in the conduction state and the fuse 22 reaches the overcurrent state by the current from the positive electrode of the battery 15 and is immediately blown, and the pull-up resistor 24 pulls up the output signal to 5V, whereby the voltage the output signal of the reverse connection storage circuit 14*d* becomes 5V.

The microcomputer 14*a* transmits the gate prohibiting signal of 5V (non-permission) to the FET driver 14*b* when the voltage of the output signal from the reverse connection storage circuit 14*d* is 5V. The microcomputer 14*a* also transmits the PWM signal to the FET driver 14*b*. In this case, the microcomputer 14*a* may not transmit the PWM signal to the FET driver 14*b*.

Furthermore, the microcomputer 14*a* notifies the driver of the occurrence of the reverse connection and the abnormality of the electric power steering apparatus, and transmits the device control signal to the lamp (not shown) and lights the lamp (light emission, flashing, color change, etc.) to urge the replacement of the controller (ECU) 14 or the reverse connection storage circuit 14*d*. Alternatively, the display signal may be transmitted to the monitor (not shown) to display the error information, or the like. The microcomputer 14*a* may transmit the device control signal or the display signal in parallel with the gate prohibiting signal.

When receiving the gate prohibiting signal of 5V (non-permission) from the microcomputer 14*a*, the FET driver 14*b* does not permit the drive of the inverter 14*c* and does not permit the control of the current of the electric motor 13 by the inverter 14*c* when receiving the PWM signal from the microcomputer 14*a* and driving the inverter 14*c* according to the PWM signal from the microcomputer 14*a*. The non-permission includes restriction and prohibition. In this case, the FET driver 14*b* may not follow the PWM signal from the microcomputer 14*a* and may not drive the inverter 14*c*. In other words, the control of the current of the electric motor 13 by the inverter 14*c* may be stopped (prohibited). Thus, when receiving the gate prohibiting signal of 5V (non-permission) from the microcomputer 14*a*, the FET driver 14*b* controls the drive of the electric motor 13 through the inverter 14*c* and does not permit the power assist. When not permitting the power assist, the power assist may be restricted (output may be lowered) or the power assist may be prohibited (stopped). The prohibition is assumed as one mode of restriction.

Modification

In the present embodiment, the electric power steering (EPS) apparatus is assumed to be a column assist type, but actually, it may be a rack assist type, a pinion assist type, or the like as long as the configuration of the present embodiment can be applied.

The reverse connection storage circuit **14*d* may be configured to be removably attached (replaceable) to the controller (ECU) 14. The reverse connection storage circuit 14*d* may also be configured to be able to repair (reproduce)/replace the fuse 22**.

Although not shown, the reverse connection storage circuit **14*d* can also be obtained by combining a sensor for detecting the occurrence of the reverse connection of the controller (ECU) 14 and the battery 15, and a memory for storing a command value indicating the occurrence of the reverse connection when the occurrence of the reverse connection is detected and outputting the command value to the microcomputer 14*a* at the next startup of the controller (ECU) 14. The sensor may detect the blow of the fuse 22. Furthermore, the memory may be arranged in the microcomputer 14*a***. The memory may also include a region for storing a flag (normal: 0, reverse connection: 1) indicating the occurrence or non-occurrence of the reverse connection. For example, the memory may be a nonvolatile memory such as EEPORM, flash memory, and the like.

If the controller (ECU) 14 is a control board, the microcomputer **14*a*, the FET driver 14*b*, the inverter 14*c*, and the reverse connection storage circuit 14*d* are arranged on the control board. Actually, however, the inverter 14*c* may be arranged independently from the controller (ECU) 14**.

From another perspective, for the configuration of the controller (ECU) 14, the "microcomputer **14*a*" can be synonymized as a "signal control unit". The "FET driver 14*b*" can be synonymized as a "drive control unit". The "reverse connection storage circuit 14*d***" can be synonymized as a "reverse connection storage unit".

EFFECTS OF THE PRESENT EMBODIMENT

The present embodiment has the following effects.

(1) The electric power steering apparatus according to the present embodiment includes the inverter configured to control the current of the electric motor that applies the steering assist torque on the steering mechanism, the battery configured to supply power to the electric motor via the inverter, and the controller (ECU) configured to drive the inverter to control the electric motor. In the controller (ECU), the drive control unit is configured to drive the inverter in accordance with the drive signal. The signal control unit is configured to transmit the drive signal to the drive control unit. The reverse connection storage unit is attached to the battery in parallel with the inverter, and is configured to detect and store the occurrence of the reverse connection of the controller (ECU) and the battery when the reverse connection has occurred, and to notify the signal control unit of the occurrence of the reverse connection at the next startup of the controller (ECU).

According to such configuration, when the reverse connection of the battery and the controller (ECU) has occurred and damage has been made by the reverse connection, the controller (ECU) detects and stores the occurrence of the reverse connection, and detects the occurrence of the reverse connection at the next startup of the controller (ECU). The damage made by the reverse connection is thereby detected, the power assist is restricted, the progress of the intermediate breakdown state by the continuous use of the controller (ECU) in the intermediate breakdown state is suppressed to a minimum, the probability of the occurrence of assist abnormality during the traveling is greatly reduced, and the secondary breakdown can be prevented in advance.

(2) When notified of the occurrence of the reverse connection from the reverse connection storage unit, the signal control unit transmits a signal indicating the non-permission of the drive of the drive control unit to the drive control unit. Upon receiving the signal indicating the non-permission from the signal control unit, the drive control unit restricts the drive of the inverter to restrict the drive of the electric motor.

Thus, the progress of the intermediate breakdown state by the continuous usage of the controller (ECU) in the intermediate breakdown state is deterred to a minimum, the probability of the occurrence of assist abnormality during the travelling is greatly reduced, and the secondary breakdown can be prevented in advance by restricting the power assist itself.

(3) When notified of the occurrence of the reverse connection from the reverse connection storage unit, the signal control unit transmits a signal indicating the non-permission of the drive of the drive control unit to the drive control unit. Upon receiving the signal indicating the non-permission from the signal control unit, the drive control unit prohibits the drive of the inverter to prohibit the drive of the electric motor.

Thus, the progress of the intermediate breakdown state by the continuous usage of the controller (ECU) in the intermediate breakdown state is completely deterred, the possibility of the occurrence of assist abnormality during the travelling is completely eliminated, and the secondary breakdown can be prevented in advance by prohibiting the power assist itself.

(4) When notified of the occurrence of the reverse connection from the reverse connection storage unit, the signal control unit transmits a signal indicating the non-permission of the drive of the drive control unit to the drive control unit, and transmits the device control signal to the notifying device to notify the driver of the occurrence of the reverse connection and urge the replacement of the controller (ECU).

Thus, the operation of lighting the lamp such as the indicator lamp or the like (light emission, flashing, color change, etc.) can be carried out to urge the driver to replace the controller (ECU) or the reverse connection storage circuit. Actually, the error information or the like may be displayed on the navigation monitor instead of lighting the lamp.

(5) If the reverse connection of the controller (ECU) and the battery has not occurred, the reverse connection storage unit outputs a signal of a first voltage to the signal control unit. The signal control unit transmits the signal of the first voltage to the drive control unit as a signal indicating permission when the voltage of the signal from the reverse connection storage unit is the first voltage. If the reverse connection has occurred, on the other hand, the reverse connection storage unit detects and stores the occurrence of the reverse connection, and outputs a signal of a second voltage to the signal control unit at the next startup of the controller (ECU) to notify the signal control unit of the occurrence of the reverse connection. The signal control unit transmits the signal of the second voltage to the drive control unit as a signal indicating non-permission when the voltage of the signal from the reverse connection storage unit is the second voltage.

According to such configuration, the present embodiment can be surely and easily implemented. For example, if the inverter is a switch circuit using the CMOS inverter, the switch circuit is turned on for the signal of 0V and the switch circuit is turned off for the signal of 5V, with the first voltage defined as 0V and the second voltage defined as 5V.

(6) In the reverse connection storage unit described above, the diode is attached to the battery in parallel with the inverter to prevent the reverse direction current by the rectification. The fuse is positioned on the anode side of the diode, and is in the conduction state if the reverse connection has not occurred, and is in the overcurrent state and blown if the reverse connection has occurred. The occurrence of the reverse connection is then detected and stored. The restriction resistor is positioned on the cathode side of the diode, and restricts the current within a range where the fuse is surely blown and the diode is not disconnected and broken down for the potential difference at time of the occurrence of the reverse connection. The pull-up resistor is connected to the signal line extending from between the diode and the fuse to the signal control unit, where the voltage of the output signal is maintained at the first voltage during the conduction state of the fuse and the voltage of the output signal is pulled up to the second voltage when the fuse is blown.

Thus, the reverse connection protecting device is not used, whereby the expensive in-vehicle relay and the drive circuit thereof used in the reverse connection protecting device can be eliminated. Furthermore, the reverse connection storage circuit is configured with a fewer number of relatively inexpensive components, whereby the circuit is effective in that the number of components can be reduced and the price can be reduced in the electric power steering apparatus.

The present invention has been described above with respect to a specific embodiment, but the present invention is not to be limited by such description. Various variants of the disclosed embodiment as well as other embodiments of the present invention should become apparent to those skilled in the art by referencing the description of the present invention. Therefore, the accompanying Claims are to be recognized as including the variants or the embodiments encompassed in the scope and the gist of the present invention.

REFERENCE SIGNS LIST

1 steering wheel
2 steering shaft
3 torque sensor
8 steering gear
10 steering assisting mechanism
11 reduction gear
13 electric motor
14 controller (ECU)
14*a* microcomputer
14*b* FET driver
14*c* inverter
14*d* reverse connection storage circuit
15 battery
16 ignition switch
17 vehicle speed sensor
18 steering angle sensor
21 diode
22 fuse
23 restriction resistor
24 pull-up resistor

The invention claimed is:

1. An electric power steering apparatus comprising:
an inverter configured to control a current of an electric motor that applies a steering assist torque on a steering mechanism;
a battery configured to supply power to the electric motor via the inverter; and
a controller connected to the battery and configured to drive the inverter to control the electric motor;
wherein the controller comprises,
a drive control unit configured to drive the inverter in accordance with a drive signal,
a signal control unit configured to transmit the drive signal to the drive control unit, and
a reverse connection storage unit attached to the battery in parallel with the inverter, the reverse connection storage unit being configured to detect and store occurrence of a reverse connection of the controller and the battery when the reverse connection has occurred, and to notify the signal control unit of the occurrence of the reverse connection at a next startup of the controller.

2. The electric power steering apparatus according to claim 1, wherein
the signal control unit is configured to transmit a signal indicating non-permission of drive of the drive control unit to the drive control unit when notified of the occurrence of the reverse connection from the reverse connection storage unit; and
the drive control unit is configured to restrict drive of the electric motor by restricting drive of the inverter when receiving the signal indicating the non-permission of the drive of the drive control unit from the signal control unit.

3. The electric power steering apparatus according to claim 1, wherein
the signal control unit is configured to transmit a signal indicating non-permission of drive of the drive control unit to the drive control unit when notified of the occurrence of the reverse connection from the reverse connection storage unit; and
the drive control unit is configured to prohibit drive of the electric motor by prohibiting drive of the inverter when receiving the signal indicating the non-permission of the drive of the drive control unit from the signal control unit.

4. The electric power steering apparatus according to claim 1, wherein the signal control unit is configured, when notified of the occurrence of the reverse connection from the reverse connection storage unit, to transmit a signal indicating non-permission of drive of the drive control unit to the drive control unit, and to transmit a device control signal to a notifying device to notify a driver of the occurrence of the reverse connection and to urge replacement of the controller.

5. The electric power steering apparatus according to claim 1, wherein
the reverse connection storage unit is configured:
to output a signal of a first voltage to the signal control unit when the reverse connection has not occurred; and
to detect and store the occurrence of the reverse connection and to output a signal of a second voltage to the signal control unit at the next startup of the controller to notify the signal control unit of the occurrence of the reverse connection, when the reverse connection has occurred, and the signal control unit is configured:

to transmit the signal of the first voltage to the drive control unit as a signal indicating permission of drive of the drive control unit when a voltage of the signal from the reverse connection storage unit is the first voltage; and to transmit the signal of the second voltage to the drive control unit as a signal indicating non-permission of the drive of the drive control unit when the voltage of the signal from the reverse connection storage unit is the second voltage.

6. The electric power steering apparatus according to claim 1, wherein the reverse connection storage unit comprises, a diode attached to the battery in parallel with the inverter, and arranged to be in a non-conduction state when the reverse connection has not occurred and to be in a conduction state when the reverse connection has occurred, a fuse positioned on an anode side of the diode, the fuse being in a conduction state when the reverse connection has not occurred and being in an overcurrent state and blown to detect and store the occurrence of the reverse connection when the reverse connection has occurred, a restriction resistor positioned on a cathode side of the diode, the restriction resistor restricting a current within a range where the fuse is surely blown and the diode is not disconnected and broken down for a potential difference at time of the occurrence of the reverse connection, and a pull-up resistor connected to a signal line extending from between the diode and the fuse to the signal control unit, and configured to maintain a voltage of an output signal at a first voltage in the conduction state of the fuse, and to pull up the voltage of the output signal to a second voltage when the fuse is blown to notify the signal control unit of the occurrence of the reverse connection.

* * * * *